United States Patent
Lejeune

[15] 3,674,315
[45] July 4, 1972

[54] CAST STEEL WHEELS FOR HEAVY-DUTY VEHICLES

[72] Inventor: Daniel Lejeune, Clermont-Ferrand, France

[73] Assignee: Compagnie Generale Des Etablissements Michelin raison sociale Michelin & Cie, Clermont-Ferrand, Puy-de-Dome, France

[22] Filed: April 1, 1970

[21] Appl. No.: 24,601

Related U.S. Application Data

[63] Continuation-in-part of Ser. No. 648,397, June 23, 1967, Pat. No. 3,530,927.

[30] Foreign Application Priority Data

June 24, 1966   France........................................66940

[52] U.S. Cl..................................................................301/65
[51] Int. Cl..................................................................B60b 3/06
[58] Field of Search...............301/65, 63 R, 6 R; 152/381, 152/379; 295/27

[56] References Cited

UNITED STATES PATENTS

| 1,581,790 | 4/1926 | Davis | 301/65 |
| 3,530,927 | 9/1970 | Lejeune | 164/120 |
| 1,022,723 | 4/1912 | Custer | 295/27 |
| 2,103,834 | 12/1937 | Tyson | 295/27 X |

FOREIGN PATENTS OR APPLICATIONS 1,365,089   5/1964   France........................................301/65

Primary Examiner—Richard J. Johnson
Attorney—Brumbaugh, Graves, Donohue & Raymond

[57] ABSTRACT

A vehicle wheel is made of cast steel and has a thickness of steel small with respect to its diameter. The steel has a carbon content within the range of 0.16 to 0.70 percent, a manganese content within the range of 0 to 1.60 percent, and a silicon content within the range of 0 to 1.00 percent. The tensile strength of the steel is within the range of 40 kg/mm² to 80 kg/mm², and the steel is hardened through about 10 to 20 percent of its thickness. The thickness of the steel is increased in the rim flange as compared to the rim base, and the axially outer wall of the rim flange is inclined with respect to the rim axis. Any shrink marks that may appear in the cast steel are concentrated in the thickened portion of the rim flange.

4 Claims, 1 Drawing Figure

PATENTED JUL 4 1972
3,674,315
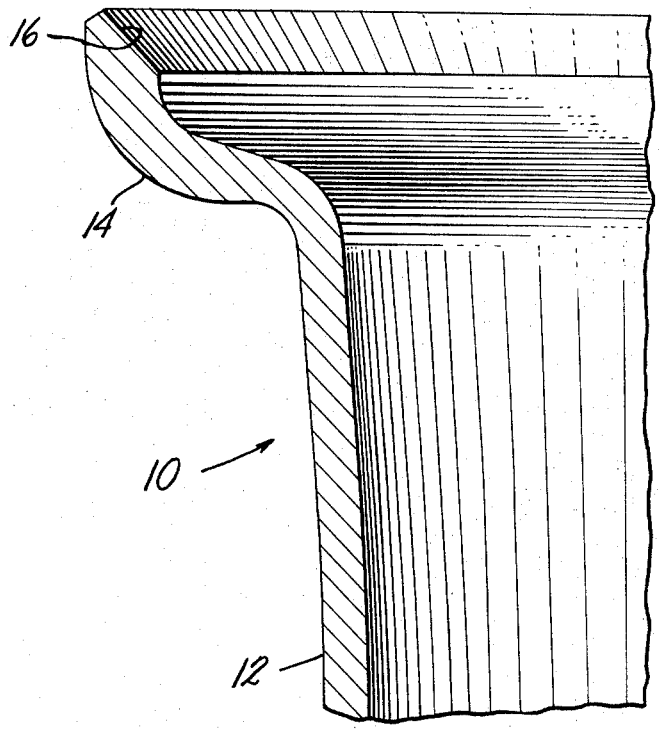
INVENTOR
DANIEL LEJEUNE
BY
Brumbaugh, Graves, Donohue & Raymond
his ATTORNEYS

CAST STEEL WHEELS FOR HEAVY-DUTY VEHICLES

CROSS-REFERENCE TO RELATED APPLICATION

This is a division and continuation-in-part of my copending application Ser. No. 648,397, filed June 23, 1967, now allowed as U.S. Pat. No. 3,530,927, for "Method of Fabrication of Metals by Pressure Casting".

CROSS-REFERENCE TO RELATED APPLICATION

This is a division and continuation-in-part of my copending application Ser. No. 648,397, filed June 23, 1967, now allowed as U.S. Pat. No. 3,530,927, for "Method of Fabrication of Metals by Pressure Casting".

BACKGROUND OF THE INVENTION

This invention relates to wheels and, more particularly, to novel and highly-effective cast steel wheels for vehicles such as earth movers and the like. Such wheels, in terms of the requirements of strength and sturdiness placed upon them, are intermediate wheels for passenger cars and light trucks on the one hand and railway wheels on the other.

Conventional steel wheels of the best quality for earth movers and the like typically have a carbon content not exceeding 0.16 percent and a tensile strength not exceeding 40 kg/mm² to 45 kg/mm². The achievable tensile strength is too low to provide a wheel optimally adapted to withstand the severe stresses to which the wheels are subjected in use, and the limitations on permissible carbon content add significantly to the cost of production.

Conventional steel wheels also have the disadvantage that they are not readily weldable and have insufficient abrasion resistance.

SUMMARY OF THE INVENTION

An object of the invention is to remedy the deficiencies of conventional wheels noted above. In particular, an object of the invention is to provide a steel wheel for heavy duty vehicles such as earth movers and the like having extremely high tensile strength, high abrasion resistance, and good weldability. Another object of the invention is to provide such a wheel economically, with wide latitude regarding carbon, manganese and silicon content. A further object of the invention is to provide a wheel of cast steel that has a low melting point and that is quite fluid in the molten state.

The foregoing and other objects of the invention are attained by the provision of a vehicle wheel made of cast steel and having a thickness of steel small with respect to its diameter, the steel being hardened through about 10 to 20 percent of its thickness. The thickness of the metal is increased in the rim flange as compared to the rim base, and the axially outer wall of the rim flange is inclined with respect to the axis of the rim. The wheel is cast in accordance with the method disclosed and claimed in my copending application, Ser. No. 648,397 identified above. Any shrink marks that may appear in the cast steel are concentrated in the thickened portion of the rim flange.

BRIEF DESCRIPTION OF THE DRAWING

An understanding of additional aspects of the invention can be gained from a consideration of the following detailed description of a preferred embodiment of the invention, in conjunction with the appended drawing, wherein the sole FIGURE is a fragmentary axial section of a cast steel wheel in accordance with the invention.

DESCRIPTION OF THE PREFERRED EMBODIMENT

The figure shows a cast steel wheel 10 having a rim base 12 and a rim flange 14. The steel has a carbon content within the range of 0.16 to 0.70 percent, a manganese content within the range of 0 to 1.60 percent, and a silicon content within the range of 0 to 1.00 percent. Preferably, the ranges are 0.35 to 0.45 percent in the case of carbon, 0.70 to 0.90 percent in the case of manganese, and 0.55 to 0.65 percent in the case of silicon.

The selection of the contents of carbon, manganese and silicon in accordance with the full ranges set forth above and particularly in accordance with the preferred ranges set forth above lowers the melting point of the steel and improves the fluidity of the molten steel. This facilitates manufacture of the wheels by the method of my copending application identified above.

Proper selection of the contents of carbon, manganese and silicon as set forth above also provides a product of increased tensile strength and abrasion resistance and improved weldability.

The tensile strength of the steel is between 40 kg/mm² and 80 kg/mm² and, for the preferred ranges mentioned above for carbon, manganese and silicon, between 70 kg/mm² and 80 kg/mm². The weldability of the steel is particularly improved for the preferred ranges set forth above.

The cast steel is hardened only by chilling, without any other thermal treatment. The hardening extends through 10 to 20 percent of the thickness of the steel. It is within the scope of the invention to modify the hardening process by use of any other thermal treatment.

The thickness of the steel is small with respect to the diameter of the wheel, unlike railway wheels.

The thickness of the steel is increased in the rim flange 14 with respect to the thickness of the steel in the rim base 12. Moreover, the rim base and flange are sloped in a continuous manner: even the axially outer portion 16 of the rim flange is inclined with respect to the axis of the wheel instead of being parallel to it as in conventional rims. These characteristics assure that the rim base is free of all pipes, shrink holes, bubbles, and unwanted impurities. Thus, any bubbles or unwanted impurities, etc., that may be present in the steel migrate to the axial extremity of the rim flange while the steel is in the molten state, because the axial extremity of the rim flange is at the top of the wheel during casting, as FIG. 4 of my copending application identified above indicates.

The following are specific examples of cast steel wheels for heavy-duty vehicles in accordance with the invention.

|  | Carbon Content | Manganese Content | Silicon Content |
|---|---|---|---|
| Example 1 | 0.20% | 1.60% | 0.66% |
| Example 2 | 0.40 | 0.79 | 0.59 |
| Example 3 | 0.69 | 0.68 | 0.80 |
| Example 4 | 0.40 | 0.85 | 0.56 |
| Example 5 | 0.17 | 0.15 | 0.10 |

The best results are obtained with the figures shown in Example 4, which are within the preferred range. The other examples also provide results substantially improved compared to the results obtainable in accordance with the prior art.

My copending application identified above fully discloses a method of making the wheel disclosed and claimed herein, and reference is made to that application for such disclosure. Briefly, the method is as follows:

First: Filling a bottom-filling mold, with liquid metal being delivered by pneumatic pressure from a casting ladle and entering the mold through a feed pipe connected with the bottom of the mold;

Second: Closing the gas escape vents contained in the mold by solidifying the metal which entered these vents, this operation being facilitated by the small opening of each vent, all this being done in order to put the liquid metal in the mold under pressure;

Third: Continuing or increasing the pneumatic pressure transmitted through the liquid metal until it cools to the liquid-solid interface;

Fourth: Causing the cooling front, i.e., the liquid-solid interface, to progress toward the filling opening in the bottom of the mold to maintain the entire liquid phase in communication with the bottom either by artificial cooling of the parts of the mold or the core which are in contact with the massive portions of the piece, or by varying the cross section of the mold or of the core thereby accelerating the cooling of the massive portions and/or slowing the cooling of the thin portions;

Fifth: Reducing pneumatic pressure abruptly when the cooling front reaches the bottom of the piece, and causing the separation of the piece from the molten casting metal to enable the liquid metal to flow back into the casting ladle.

The entire molding cycle is carried out at a speed such that the difference of temperatures between the first point of solidification and the last point of solidification does not exceed approximately 50° C. when pneumatic pressure is reduced so that at that time, the piece in its entirety is in pasty condition and it becomes possible to extract from the mold the workpiece or the withdrawable core giving shape to the inside of the piece prior to the contraction of the workpiece. For example, a piece weighing 10 kg and having an average thickness of about 6 mm is cast within 8 to 10 seconds and a piece weighing 40 kg having an average thickness of 10 mm is cast within 10 to 15 seconds.

The method is carried out in several stages.

The first stage is that of filling of the mold. The metal is conveyed by pneumatic pressure from the casting ladle to the mold to facilitate automatization of feeding, at controlled speed and at large deliveries, without stirring or pollution of the liquid bath.

The second and third stages are those of putting the liquid metal in the mold under pressure: the mold being full, the metal following in the path of the gases which were contained in the mold enters the vents, and due to the vents' small cross section, closes them by solidifying the metal therein instantaneously. These vents may be quite simply a slight clearance in the joints of the mold. In the third stage, pressure is increased to offset the shrinkage on solidification and prevent shrinkage holes and internal defects which may be caused by an insufficiency of metal.

The fourth stage is concerned with the cooling process. Regardless of the shape and the cross-section of the piece to be case, it is advisable to avoid bottling up a liquid pocket between solidified walls which isolates the pocket from the feeding liquid metal under pressure and results in an insufficiency of metal and thus shrinkage holes on solidification. Acceleration or slowing down of cooling, depending on the case, makes it possible to prevent the formation of shrinkage holes. In general, the cooling rate can be controlled by providing mold or core walls of suitable thickness. In exceptional cases, cooling by circulation of a cooling fluid may be necessary. The form of the piece to be manufactured determines the zones for which acceleration or retarding of cooling will be required.

The fifth stage is the separation of the piece. In order to assure such separation, in spite of the possible presence of a film of solidified metal on the inner walls of the feed pipe, a small collar, located at the joint of the bottom of the mold and the head of the feed pipe, is reheated or its cooling rate retarded to ensure the presence of a zone in which the metal remains liquid in the breaking-off zone. In addition, one may also provide for moving the mold with respect to the pipe in order to facilitate separation.

Preferably, graphite molds are used. The use of graphite molds offers many advantages. Graphite's expansion coefficient, and thus its shrinkage on cooling, is very low. The low shrinkage of graphite molds in turn permits precision in the production of the cast pieces. Graphite is porous and facilitates the escape of the gases enclosed in the liquid metal, as do the best molding sands, without itself giving off any gas. Consequently, there are no blisters on the cast pieces. Graphite may be machined to an excellent polish and this gives the cast pieces an excellent surface quality. Graphite has very high mechanical resistance to heat which increases as the temperature increases and it withstands thermic shocks very well which facilitates repeated use as permanent mold. Graphite has high heat conducting ability and thus rapid cooling, contrary to the refractory materials used in conventional metal founding, and allows regulation of the cooling speed within wide limits by variation of the thickness of the walls of the mold. Furthermore, graphite facilitates extra-rapid cooling and this on the one hand makes it possible to separate the surface of the piece due to the formation of a skin which, by contraction, detaches itself from the mold and, on the other hand accelerates the thermic phenomen and facilitates automatization of the casting. The high heat conductivity of graphite also permits direct contact with liquid steel, the cooling of the steel being more rapid as the thickness of the graphite increases. To protect the mold from deterioration by the high temperatures, the graphite may be protected by black lead or other luting material. Lastly, graphite may be used without danger of oxidation at temperatures up to 550° C. Naturally, it is advisable to preheat the graphite for the casting of the first piece and to avoid excessive cooling between successive castings. A permanent regulated temperature ranging from 150° to 400° C., depending on the workpiece, its form, its weight and its thickness, may be used.

During the extra-rapid cooling of the liquid steel, the cooling front or liquid-solid interface moves at a speed of up to 30 cm per second for pieces having a thickness of the metal of 6 to 10 mm, so that the temperature difference between the first and the last solidification points of the workpiece is less than 50° C. Under these conditions, the entire workpiece passes through a plastic stage of a certain duration during which either the core is withdrawn from the workpiece or the workpiece from the mold before setting due to cooling shrinkage and the appearance of cracks. To extract a substantially cylindrical workpiece or a core, a taper of 1° to 2° is sufficient.

The workpieces obtained in accordance with the invention are characterized by the fact that they are cast and hardened at the same time, due to the speed of cooling. This hardening extends through an appreciable part of the thickness of the metal, for example 10 to 20 percent. As a result, excellent mechanical properties are obtained even for common quality raw materials. Specifically the disclosed method offers the advantage of not limiting the characteristics of the steels used as is true for the types of steel which are to be used for stamping or welding. For example, in accordance with the disclosed method, one can make steel wheels for vehicles with 0.70 percent carbon content, having a tensile strength of 75 to 80 kg/mm$^2$, while wheels could be obtained in accordance with conventional founding methods only from steel having no more than 0.16 percent carbon content and a tensile strength of 40 to 45 kg/mm$^2$.

The pneumatic injection molding press used in making wheels in accordance with the present invention includes the following elements which may occupy predetermined positions in relation to a supporting structure:

a. an enclosure capable of holding a liquid metal ladle, connected to a source and to a discharge of compressed gas and provided with a removable lid closing tightly;

b. at least one feed pipe supported tightly by the lid of the enclosure, submerged in the liquid metal bath on one side and emerging from the enclosure on the other side, the head of the feed pipe being connected to the bottom of a mold by means of a joint made of some refractory and plastic material, for example asbestos;

c. a mold supporting slab suspended elastically above the enclosure, comprising a passage for the feed pipe nozzle or for the bottom of the mold as well as mechanism for centering the mold above the feed pipes;

d. a mold to be placed on this supporting slab, consisting of permanent elements, by preference of graphite, assembled in a metal casting box having a feed opening at its bottom and an opening for withdrawal of the cast piece in its upper part;

e. a core, likewise consisting of permanent elements, preferably made of graphite, resting on a metal support;

f. a movable support of the core, moved by jacks for centering the core and the mold as well as immobilizing the workpiece, closing and opening the mold by inserting and withdrawing the core, and assuring a tight connection between the bottom of the mold and the nozzle of the feed pipe or their separation, by pressure or release of pressure on the mold.

The press further includes mechanisms for the displacement of the enclosure, for example, a carriage, rails and a winch in order to facilitate the refilling of the ladle with metal, mechanisms for moving the mold to withdraw the workpiece and replace the elements used, and control mechanisms for feeding the metal, for moving the core support, and for regulating the cooling circuits.

Thus there is provided in accordance with the invention a novel and highly-effective cast steel wheel for heavy-duty vehicles having improved properties and reduced cost as compared to conventional wheels. Many modifications of the representative embodiment disclosed herein will readily occur to those skilled in the art, and the invention is to be construed as including all of the embodiments thereof within the scope of the appended claims.

I claim:

1. A cast steel wheel for vehicles such as earth movers and the like, each wheel being provided with a rim base and a radially extending rim flange and having a generally uniform thickness of steel small with respect to its diameter and substantially within the range of 6 mm to 10 mm, said steel having a carbon content within the range of 0.20 to 0.45 percent and a tensile strength within the range of 70 kg/mm$^2$ to 80 kg/mm$^2$, and said steel being hardened through about 10 to 20 percent of its thickness.

2. A wheel made of cast steel for vehicles such as earth movers and the like, each wheel being provided with a rim base and a radially extending rim flange and having a generally uniform thickness of steel small with respect to its diameter and substantially within the range of 6 mm to 10 mm, said steel having a carbon content within the range of 0.20 to 0.45 percent, a manganese content within the range of 0.70 to 0.90 percent, and a silicon content within the range of 0.55 to 0.65 percent.

3. A wheel made of cast steel for vehicles such as earth movers and the like, having a thickness of steel small with respect to its diameter and substantially within the range of 6 mm to 10 mm and comprising a rim base and an outwardly extending rim flange, the steel of said rim flange being thicker than the steel of said rim base, said rim base being free of shrink holes and said rim flange being formed with a shrink hole.

4. A wheel according to claim 3 wherein the axially outer wall of the rim flange is inclined with respect to the rim axis.

* * * * *